US012672659B2

(12) United States Patent
Chen et al.

(10) Patent No.: US 12,672,659 B2
(45) Date of Patent: Jul. 7, 2026

(54) BEVERAGE OR FOOD BREWING METHOD AND BEVERAGE OR FOOD BREWING MACHINE

(71) Applicant: Fortune-Tech Manufacturing Co., Ltd., Guangdong (CN)

(72) Inventors: Xuejun Chen, Zhuhai (CN); Yong Li, Zhuhai (CN); Long Ma, Zhuhai (CN); Zhi Wang, Zhuhai (CN)

(73) Assignee: FORTUNE-TECH MANUFACTURING CO., LTD., Guangdong (CN)

( * ) Notice: Subject to any disclaimer, the term of this patent is extended or adjusted under 35 U.S.C. 154(b) by 287 days.

(21) Appl. No.: 18/014,696

(22) PCT Filed: Sep. 10, 2021

(86) PCT No.: PCT/CN2021/117760
§ 371 (c)(1),
(2) Date: Jan. 5, 2023

(87) PCT Pub. No.: WO2022/095600
PCT Pub. Date: May 12, 2022

(65) Prior Publication Data
US 2023/0270130 A1 Aug. 31, 2023

(30) Foreign Application Priority Data

Nov. 5, 2020 (CN) .......................... 202011224230.8

(51) Int. Cl.
*A23F 5/08* (2006.01)
*A23F 5/26* (2006.01)
(Continued)

(52) U.S. Cl.
CPC .................. *A23F 5/08* (2013.01); *A23F 5/26* (2013.01); *A47J 31/0663* (2013.01);
(Continued)

(58) Field of Classification Search
CPC . A23F 5/08; A23F 5/26; A47J 31/0657; A47J 31/0663; A47J 31/24; A47J 31/3671;
(Continued)

(56) References Cited

U.S. PATENT DOCUMENTS

| | | | | |
|---|---|---|---|---|
| 4,767,632 A | * | 8/1988 | Meier | A47J 31/42 |
| | | | | 99/283 |
| 5,660,336 A | * | 8/1997 | Joseph, Jr. | A47J 42/44 |
| | | | | 241/27 |

(Continued)

FOREIGN PATENT DOCUMENTS

| | | |
|---|---|---|
| CN | 101621948 A | 1/2010 |
| CN | 102026568 A | 4/2011 |

(Continued)

OTHER PUBLICATIONS

Swift River Roasters; "How to Brew the Perfect Pot of Coffee"; Mar. 6, 2019; https://www.swiftrivercoffee.com/blog/2019/3/6/how-to-brew-the-perfect-pot-of-coffee (Year: 2019).*

(Continued)

*Primary Examiner* — Erik Kashnikow
*Assistant Examiner* — Austin Parker Taylor
(74) *Attorney, Agent, or Firm* — GREENBLUM & BERNSTEIN, P.L.C.

(57) ABSTRACT

The present disclosure relates to a beverage or food brewing method and a beverage or food brewing machine. The beverage or food brewing method includes following steps: actuating a beverage or food brewing machine to produce powder through a grinding device and to output the powder to a powder holder; when the powder in the powder holder reaches a set amount, obtaining a first grinding time value T11 of the beverage or food brewing machine; according to the first grinding time value T11, obtaining a prolonged grinding time value T12 corresponding to the first grinding (Continued)

time value T11; making the grinding device continue operating for a period of time determined by the prolonged grinding time value T12 and outputting the powder from the grinding device to the powder holder.

7 Claims, 7 Drawing Sheets

(51) Int. Cl.

| | | |
|---|---|---|
| A47J 31/06 | (2006.01) | |
| A47J 31/36 | (2006.01) | |
| A47J 31/42 | (2006.01) | |
| A47J 31/52 | (2006.01) | |

(52) U.S. Cl.
CPC ........... *A47J 31/3671* (2013.01); *A47J 31/42* (2013.01); *A47J 31/525* (2018.08)

(58) Field of Classification Search
CPC .......... A47J 31/40; A47J 31/401; A47J 31/42; A47J 31/52; A47J 31/525; A47J 43/04; A61F 2002/4645; A22C 17/0026; B02C 19/00; B02C 25/00
USPC ....... 426/231, 432; 99/285, 286, 287, 289 R, 99/300
See application file for complete search history.

(56) References Cited

U.S. PATENT DOCUMENTS

| | | | | |
|---|---|---|---|---|
| 6,783,089 | B2 | 8/2004 | Lassota | |
| 10,327,593 | B2 | 6/2019 | Laffi | |
| 2003/0025012 | A1 | 2/2003 | Lassota | |
| 2009/0056555 | A1 * | 3/2009 | Beule | A47J 31/42 |
| | | | | 222/1 |
| 2009/0145302 | A1 | 6/2009 | Dutertre et al. | |
| 2011/0297002 | A1 * | 12/2011 | Vitel | A47J 31/3614 |
| | | | | 99/287 |
| 2015/0359381 | A1 | 12/2015 | Anthony et al. | |
| 2018/0153349 | A1 * | 6/2018 | Abbiati | A47J 31/404 |
| 2018/0192815 | A1 | 7/2018 | Vastardis et al. | |
| 2018/0344088 | A1 * | 12/2018 | Alessi | A47J 42/44 |
| 2019/0301924 | A1 | 10/2019 | Muheim et al. | |

FOREIGN PATENT DOCUMENTS

| | | | | | |
|---|---|---|---|---|---|
| CN | 102215725 | A | | 10/2011 | |
| CN | 102327064 | A | | 1/2012 | |
| CN | 102806112 | B | * | 2/2016 | |
| CN | 108433546 | A | | 8/2018 | |
| CN | 109124394 | A | | 1/2019 | |
| CN | 109497836 | A | | 3/2019 | |
| CN | 111493668 | A | * | 8/2020 | A47J 42/38 |
| CN | 111671310 | A | | 9/2020 | |
| CN | 111671311 | A | | 9/2020 | |
| CN | 112426040 | A | | 3/2021 | |
| CN | 214433709 | U | | 10/2021 | |
| DE | 24 02 446 | A1 | | 1/1974 | |
| EP | 2 578 121 | A1 | | 4/2013 | |
| JP | 04-354913 | A | | 12/1992 | |
| WO | WO-2019246463 | A1 | * | 12/2019 | A22C 7/0076 |

OTHER PUBLICATIONS

International Search Report dated Nov. 25, 2021 issued in corresponding Patent Application No. PCT/CN2021/117760 w/English Abstract (6 pages).
Written Opinion dated Nov. 25, 2021 issued in corresponding Patent Application No. PCT/CN2021/117760 w/ English Abstract (6 pages).
Office Action issued in the corresponding Chinese Patent Appl No. 202180075070.1 dated Apr. 25, 2025, along with English translation thereof.
European Search Report dated Jun. 24, 2024 issued in corresponding Patent Application No. EP 21888299, 11 pages.
Notice of Allowance issued in corresponding Chinese Patent Application No. 202180075070.1 dated Jan. 26, 2026.

\* cited by examiner

<u>30</u>

BEVERAGE OR FOOD BREWING METHOD AND BEVERAGE OR FOOD BREWING MACHINE

CROSS-REFERENCE TO RELATED APPLICATION

This application is an U.S. national phase application under 35 U.S.C. § 371 based upon international patent application No. PCT/CN2021/117760 filed on Sep. 10, 2021, which itself claims priority to Chinese patent application No. 202011224230.8, filed on Nov. 5, 2020. The contents of the above identified applications are hereby incorporated herein in their entireties by reference.

TECHNICAL FIELD

The present disclosure belongs to the field of home appliances, and specifically relates to a beverage or food brewing method and a beverage or food brewing machine.

BACKGROUND

For the pressure coffee maker, coffee extraction from coffee powder refers to the process that hot water in a boiler evenly passes through a compressed coffee powder under drive of an electromagnetic pump. This process will extract colloids, fats, and other substances from the coffee powder.

As shown in FIG. 1, generally speaking, to make a cup of coffee with a pressure coffee maker, the user first adds a certain amount of coffee powder into a powder basket, then tamps the powder in the basket to form a compressed cylinder with a certain height, and then arranges the basket into a powder holder 51 of a brewer. The brewer includes a shower head 1, and it is needed to form a gap of about 1-2 mm between the shower head 1 and the top of the cylinder 2, so that the water from the shower head 1 can be distributed onto the surface of the cylinder 2 and evenly pass through the cylinder 2, while the cylinder 2 is allowed to expand by absorbing water and come into contact with the shower head 1. If there is no gap between the shower head 1 and the top of the cylinder 2 or the gap is too small, the water cannot evenly pass through the cylinder 2, resulting in uneven extraction. If the gap is too large, the cylinder 2 and the water will be mixed into a thin paste during the extraction process, which cannot guarantee the brewing pressure and thus affects the quality of the brewed coffee.

The conventional pressure coffee maker usually has no quantitative function, and the powder is manually tamped, which is inaccurate in amount. When the amount of ground powder formed by the grinding device reaches a set value, there is still residual coffee beans/coffee powder in the grinding device. The conventional pressure coffee maker is quite arbitrary in control of the compressed cylinder of the coffee powder, resulting in height deviation of the compressed cylinder, which affects the effect of coffee brewing.

SUMMARY

An object of the present disclosure is to provide a beverage or food brewing method and a beverage or food brewing machine, which can precisely control the amount of powder, improve the taste of the brewed beverage or food, and have a relatively high degree of automation.

The technical solutions are as follows:

The present disclosure provides a beverage or food brewing method, which includes following steps:

a beverage or food brewing machine actuating to produce powder through a grinding device and to output the powder to a powder holder;

when an amount of the powder in the powder holder reaches a set value, obtaining a first grinding time value T11 of the beverage or food brewing machine;

according to the first grinding time value T11, obtaining a prolonged grinding time value T12 corresponding to the first grinding time value T11;

the grinding device continuing operating for a period of time determined by the prolonged grinding time value T12 and outputting the powder from the grinding device to the powder holder.

In an embodiment, the powder enters the powder holder while the grinding device grinds, and a powder compressing device synchronously compresses the powder in the powder holder.

In an embodiment, the beverage or food brewing machine produces the powder through the grinding device, and the powder enters the powder holder; with increase of the amount of the powder, the powder compressing device moves upward; when the powder compressing device moves upward and reaches a first set position, a current grinding time is T11; the grinding device continues operating for the prolonged grinding time value T12 and pushes the remaining powder into the powder holder.

In an embodiment, $T12=T11\times M+N$, wherein M is a first adjustment coefficient and N is a second adjustment coefficient.

In an embodiment, according to the grinding time value T1, a grinding range Q corresponding to the grinding time value T1 is obtained; according to the grinding range Q, a water injection amount S corresponding to the grinding range Q is obtained; according to the water injection amount S, corresponding amount of water is injected into the powder to complete coffee brewing.

In an embodiment, the grinding range Q is selected from at least a first range Q1 and a second range Q2; a start point of the first range Q1 is q1, and an end point of the first range Q1 is q6; a start point of the second range Q2 is q7, and an end point of the second range Q2 is q12; wherein $q1<q6<q7<q12$; when $q1\leq T1\leq q6$, the grinding time value T1 is in the first range Q1; when $q7\leq T1\leq q12$, the grinding time value T1 is in the second range Q2.

In an embodiment, the first range Q1 and/or the second range Q2 at least includes a first sub-range FQ1 and a second sub-range FQ2; according to the grinding time value T1, the first sub-range FQ1 or the second sub-range FQ2 corresponding to the grinding time value T1 is determined; according to the first sub-range FQ1 or the second sub-range FQ2, brewing time information P or brewing temperature information C corresponding to the first sub-range FQ1 or the second sub-range FQ2 is obtained; according to the brewing time information P, coffee is brewed according to brewing time determined from the brewing time information P, or according to the brewing temperature information C, coffee is brewed according to brewing temperature determined from the brewing temperature information C.

In an embodiment, in the first range Q1, a start point of the first sub-range FQ1 is q2, and an end point of the first sub-range FQ1 is q3; a start point of the second sub-range FQ2 is q4, and an end point of the first sub-range FQ1 is q5; in the second range Q2, a start point of the first sub-range FQ1 is q8, and an end point the first sub-range FQ1 is q9; a start point of the second sub-range FQ2 is q10, and an end point of the second sub-range FQ2 is q11; wherein $q1\leq q2\leq q3\leq q4\leq q5\leq q6\leq q7\leq q8\leq q9\leq q10\leq q11\leq q12$ The present disclosure further provides a beverage or food brewing machine. The beverage or food brewing machine includes a readable storage medium on which a control program is stored, and the control program controls the beverage or food brewing machine to implement the steps of the method.

The present disclosure further provides a beverage or food brewing machine. The beverage or food brewing machine includes:

a grinding device configured to grind food material into powder;

a first sensor configured to sense grinding time of the grinding device and obtain the first grinding time value T11;

a calculator, configured to calculate prolonged grinding time value T12 according to the first grinding time value T11;

wherein the grinding device is configured to continue grinding coffee into powder according to a prolonged grinding time determined by the prolonged grinding time value T12.

The technical solutions provided by the present disclosure have the following advantages and effects:

In the present disclosure, the first grinding time value T11 is the time taken when the amount of powder produced by the grinding device reaches the set value. The prolonged grinding time value T12 is obtained according to the first grinding time value T11. When the amount of powder in the powder holder reaches the set value, the grinding device continues operating for the prolonged grinding time value T12, and outputs the remaining powder, which is an accurate control of the powder amount in the powder holder, so as to reduce a height deviation of a compressed cylinder of the coffee powder and improve the taste of the brewed coffee.

BRIEF DESCRIPTION OF THE DRAWINGS

The accompanying drawings here show specific examples of the technical solutions of the present disclosure, forming a part of the specification together with the specific embodiments, and are used to explain the technical solutions, principles and effects of the present disclosure.

Unless otherwise specified or defined, in different drawings, the same reference numerals represent the same or similar technical features, and the same or similar technical features may also be represented by different reference numerals.

Figure 1:
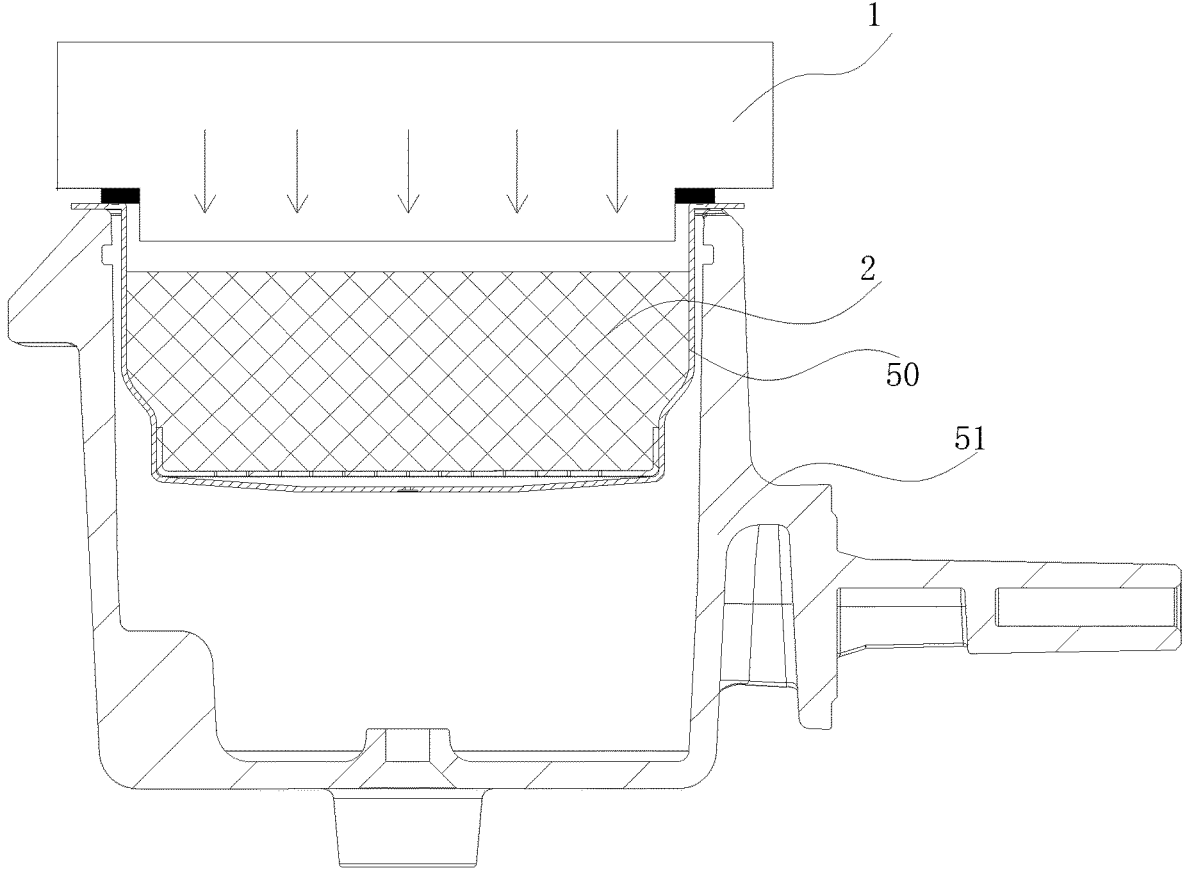
FIG. 1 is a schematic view of a conventional pressure coffee maker mentioned in the background.

Description of reference numbers:

1, shower head; 2, compressed cylinder of powder; 10, base; 11, position-limiter; 12, powder channel; 20, grinding device; 30, powder compressing device; 31, shaft; 311, shaft neck; 312, end; 32, powder compressing head; 321, shaft groove; 322, magnetic granule; 40, sensor; 41, emitter; 42, receiver; 50, powder holder; 51, fixing bracket; 60, control chip.

DETAILED DESCRIPTION

In order to facilitate understanding of the present disclosure, specific embodiments of the present disclosure will be further described in detail below with reference to the accompanying drawings.

Unless specifically defined or otherwise defined, all technical and scientific terms used herein have the same meaning as commonly understood by one of ordinary skill in the art. All technical and scientific terms used herein may also have meanings corresponding to the purpose of realizing the technical solutions of the present disclosure in combination with the actual scenarios of the technical solutions of the present disclosure.

Unless specifically stated or otherwise defined, "first", "second", etc. as used herein is only used to distinguish names, and does not connote a specific quantity or order.

Unless specifically stated or otherwise defined, the term "and/or" as used herein includes any and all combinations of one or more of the associated listed items.

It should be noted that when an element is considered to be "fixed" to another element, it may be directly fixed to the other element or via an intermediate element. When an element is referred to as being "connected" to another element, it may be directly connected to the other element or via an intermediate element. When an element is referred to as being "mounted" to another element, it may be directly mounted to the other element or via an intermediate element. When an element is referred to as being "disposed on" another element, it can be directly disposed on the other element or via an intermediate element.

Unless specifically stated or otherwise defined, the terms "said" and "the" are used herein to refer to the previously mentioned or described technical features or technical contents before the current positions. The current technical features or technical contents can be the same as or similar to the previously mentioned technical features or technical contents.

Undoubtedly, the technical contents or technical features that are against or obviously contradictory to the object of the present disclosure should be excluded.

As shown in FIG. 2 to FIG. 7, the beverage or food brewing machine in the present embodiment is a coffee maker, which includes a base 10, and further includes a grinding device 20 and a powder compressing device 30 disposed on the base 10.

The grinding device 20 is located at an upper portion of the base 10. The grinding device 20 has a powder outlet. The powder compressing device 30 is located at a lower portion of the base 10. The grinding device 20 is in communication with the powder compressing device 30 through a powder channel 12.

During the grinding process, the powder compressing device 30 acts on coffee powder in a powder holder 50 by gravity, compressing the coffee powder under gravity. With the increase of the amount of the coffee powder, the powder compressing device 30 gradually moves upward. A sensor 40 is disposed between the base 10 and the powder compressing device 30. The sensor 40 is configured to sense the position of the powder compressing device 30.

The powder compressing device 30 includes a shaft 31 and a powder compressing head 32 connected to the shaft 31. A shaft groove 321 is provided in the middle of the powder compressing head 32. A magnetic granule 322 is arranged in the shaft groove 321. The magnetic granule 322 is a first magnetic attraction part. An end of the shaft 31 is inserted into the shaft groove 321. The end 312 of the shaft 31 is made of iron material, and the end 312 of the shaft 31 is a second magnetic attraction part. When the end of the shaft 31 is inserted into the shaft groove 321, it is attracted by the magnetic granule 322 in the shaft groove 321, and does not need to be fixedly connected to the shaft groove 321 by screws or other fasteners.

The sensor 40 includes an emitter 41 and a receiver 42. The emitter 41 is opposite to the receiver 42. The powder compressing device 30 includes a sensing part corresponding to the emitter 41 and the receiver 42. The sensing part is a shaft neck 311 of the shaft 31. The emitter 41 can emit infrared light. During the moving of the shaft 31 along an axial direction, when the shaft neck 311 faces the sensor 40, the infrared light emitted by the emitter 41 is received by the receiver 42, and when the shaft neck 311 of the shaft 31 is away from the sensor 40, the infrared light emitted by the emitter 41 is blocked by the shaft 31.

A position-limiter 11 is also provided between the shaft 31 and the base 10. The position-limiter 11 is a position-limiting plate disposed on the base 10. The position-limiting plate is located above the shaft 31.

In a natural state, the position of the shaft 31 is a first position. When the sensing part faces the sensor 40, the position of the shaft 31 is a second position (e.g., a first set position). When the shaft 31 is limited by the position-limiter 11, the position of the shaft 31 is a third position (e.g., a second set position). The second position is higher than the first position, and the third position is higher than the second position.

The above-described coffee maker includes a control chip 60, and the control chip 60 includes a readable storage medium on which a control program is stored. The control program controls the coffee maker to implement steps of a method described below.

Figure 6:
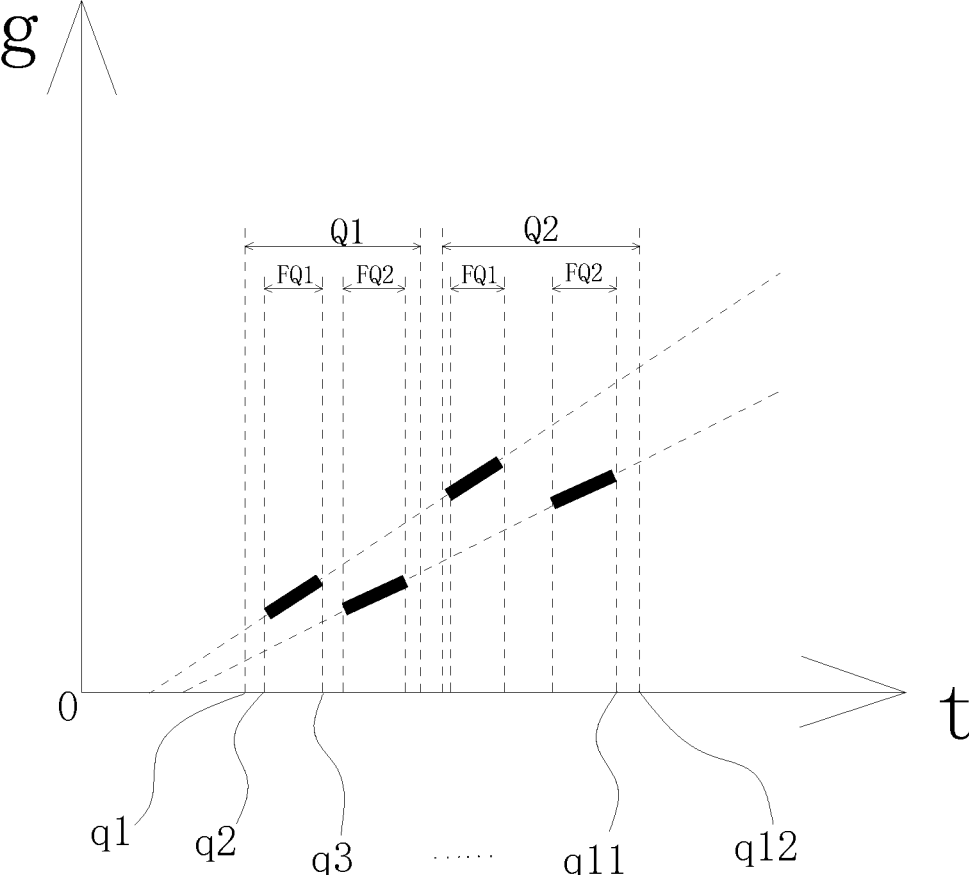
FIG. 6 is a schematic view of two preset time ranges for a single-cup coffee grinding time and a double-cup coffee grinding time in an embodiment of the present disclosure.
Figure 7:
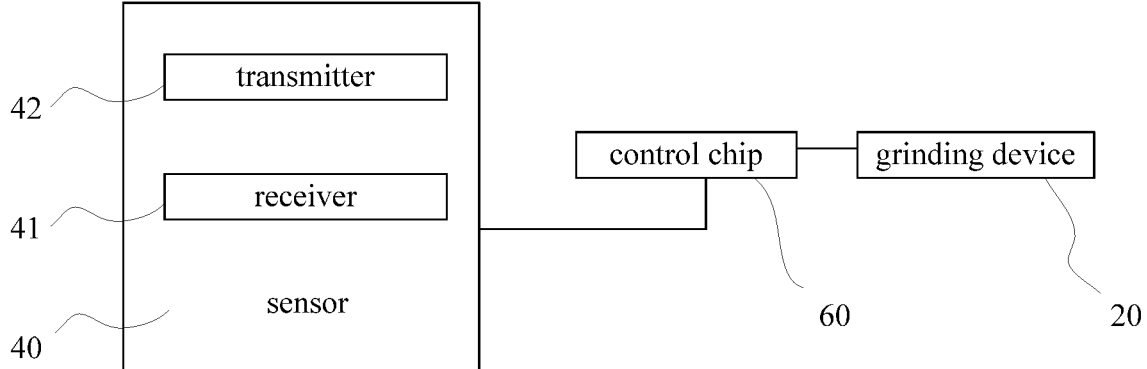
FIG. 7 is a control block diagram of the present disclosure.

For the convenience of description, the control method and steps can be comprehended with reference to FIG. 6. In FIG. 6, g represents the amount of powder, t represents time, Q1 is a first range, Q2 is a second range, FQ1 is a first sub-range, and FQ2 is a second sub-range. Restricted by the scale of the drawing, the start and end points (i.e., q1, q2, q3, q4, q5, q6, q7, q8, q9, q10, q11, q12) of the ranges are not completely shown.

1. A prolonged grinding time is determined according to an initial grinding time, and remaining coffee powder is discharged into the powder holder 51 according to a specific situation:

Specifically, the coffee maker is actuated to produce coffee powder through the grinding device 20, and outputs the coffee powder to the powder holder 51.

When the coffee powder in powder holder 51 reaches a set amount, a first grinding time value T11 of the coffee maker is obtained.

According to the first grinding time value T11, a prolonged grinding time value T12 corresponding to the first grinding time value T11 is obtained.

The grinding device 20 continues operating for a period of time determined by the prolonged grinding time value T12 and outputting the powder from the grinding device 20 to the powder holder 51.

In the present embodiment, the first grinding time value T11 is the time taken when the amount of powder produced by the grinding device reaches the set value. The prolonged grinding time value T12 is obtained according to the first grinding time value T11. When the amount of powder in the powder holder reaches the set value, the grinding device continues operating for the prolonged grinding time value T12, and outputs the remaining powder, which is an accurate control of the powder amount in the powder holder, so as to reduce a height deviation of a compressed cylinder of the coffee powder and improve the taste of the brewed coffee.

2. The amount of water injected is determined according to the range in which the grinding time of the coffee maker locates:

Specifically, the coffee maker is actuated to produce coffee powder through the grinding device 20, and outputs the coffee powder to the powder holder 51.

A grinding time value T1 of the coffee maker is obtained.

According to the grinding time value T1, a grinding range Q corresponding to the grinding time value T1 is obtained.

According to the grinding range Q, a water injection amount S corresponding to the grinding range Q is obtained.

According to the water injection amount S, the corresponding amount of water is injected into the coffee powder to complete the coffee brewing.

It can be understood that the grinding time value T1 can be the first grinding time value T11, can be the first grinding time value T11 multiplied by a coefficient, or can be a sum of the first grinding time value T11 and the prolonged grinding time value T12.

While the grinding device 20 grinds, the ground coffee powder enters the powder holder 51, and the powder compressing device 30 synchronously compresses the coffee powder in the powder holder 51. As the amount of the coffee powder in the powder holder 51 increases, the powder compressing device 30 gradually moves upward and triggers the sensor.

$T12 = T11 \times M + N$, where M is a first adjustment coefficient and N is a second adjustment coefficient. The first adjustment coefficient M and the second adjustment coefficient N can be set as needed. When setting the first adjustment coefficient M and the second adjustment coefficient N, one or more factors such as the grinding efficiency of the grinding device 20, the capacity of the grinding device 20, the capacity of the powder holder 51, and the particle size of the powder can be considered.

The coffee maker produces coffee powder through the grinding device 20, and the ground coffee powder enters the powder holder 51. With the increase of the amount of the coffee powder, the powder compressing device 30 moves upward. When the powder compressing device 30 moves upward and reaches the first set position, the current time taken for the grinding is T11. The grinding device 20 continues operating for the prolonged grinding time value T12 and pushes the remaining coffee powder into the powder holder 51.

The grinding range Q can be selected from least a first range Q1 and a second range Q2. The start point of the first range Q1 is q1, and the end point of the first range Q1 is q6. The start point of the second range Q2 is q7, and the end point of the second range Q2 is q12. q1<q6<q7<q12.

When q1≤T1≤q6, the grinding time value T1 is in the first range Q1.

When q7≤T1≤q12, the grinding time value T1 is in the second range Q2.

The first range Q1 and the second range Q2 both include a first sub-range FQ1 and a second sub-range FQ2.

In the first range Q1, the start point of the first sub-range FQ1 is q2, and the end point of the first sub-range FQ1 is q3; the start point of the second sub-range FQ2 is q4, and the end point of the first sub-range FQ1 is q5.

In the second range Q2, the start point of the first sub-range FQ1 is q8, and the end point the first sub-range FQ1 is q9; the start point of the second sub-range FQ2 is q10, and the end point of the second sub-range FQ2 is q11.

$$q1 \leq q2 \leq q3 \leq q4 \leq q5 \leq q6 \leq q7 \leq q8 \leq q9 \leq q10 \leq q11 \leq q12.$$

According to the grinding time value T1, the first sub-range FQ1 or the second sub-range FQ2 corresponding to the grinding time value T1 is obtained.

According to the first sub-range FQ1 or the second sub-range FQ2, brewing time information P or brewing temperature information C corresponding to the first sub-range FQ1 or the second sub-range FQ2 is obtained.

According to the brewing time information P, coffee is brewed according to the brewing time determined from the brewing time information P; or, according to the brewing temperature information C, coffee is brewed according to the brewing temperature determined from the brewing temperature information C.

When the coffee maker is in the grinding process, it may be impossible to directly determine whether the current grinding is for making single cup coffee or double cup coffee, and it may be impossible to automatically determine the water amount of the brewed coffee. However, in the present embodiment, the grinding time of the coffee maker can be obtained through the sensor 40. According to the grinding range which the grinding time belongs to, the current coffee size, e.g., single cup or double cup, can be indirectly determined, and then the amount of water used for brewing coffee can be automatically matched.

Specifically as shown in FIG. 6:

1. If the grinding time value T1 falls into the second sub-range FQ2 whose start point is q4 and end point is q5, it means that the current coffee powder produced by the coffee maker is fine powder, and the current size is single cup, according to which corresponding amount of water can be injected.

2. If the grinding time value T1 falls into the second sub-range FQ2 whose start point is q10 and end point is q11, it means that the current coffee powder produced by the coffee maker is fine powder, and the current size is double cup, according to which corresponding amount of water can be injected.

3. If the grinding time value T1 falls into the first sub-range FQ1 whose start point is q2 and end point is q3, it means that the current coffee powder produced by the coffee maker is coarse powder, and the current size is single cup, according to which corresponding amount of water can be injected.

4. If the grinding time value T1 falls into the first sub-range FQ1 whose start point is q8 and end point is q9, it means that the current coffee powder produced by the coffee maker is coarse powder, and the current size is double cup, according to which corresponding amount of water can be injected.

In grinding, the realization process of the coffee maker is as follows:

Mount the powder holder 51 to the fixing frame 51 and under the powder channel 12, and then actuate the coffee maker.

Figure 2:
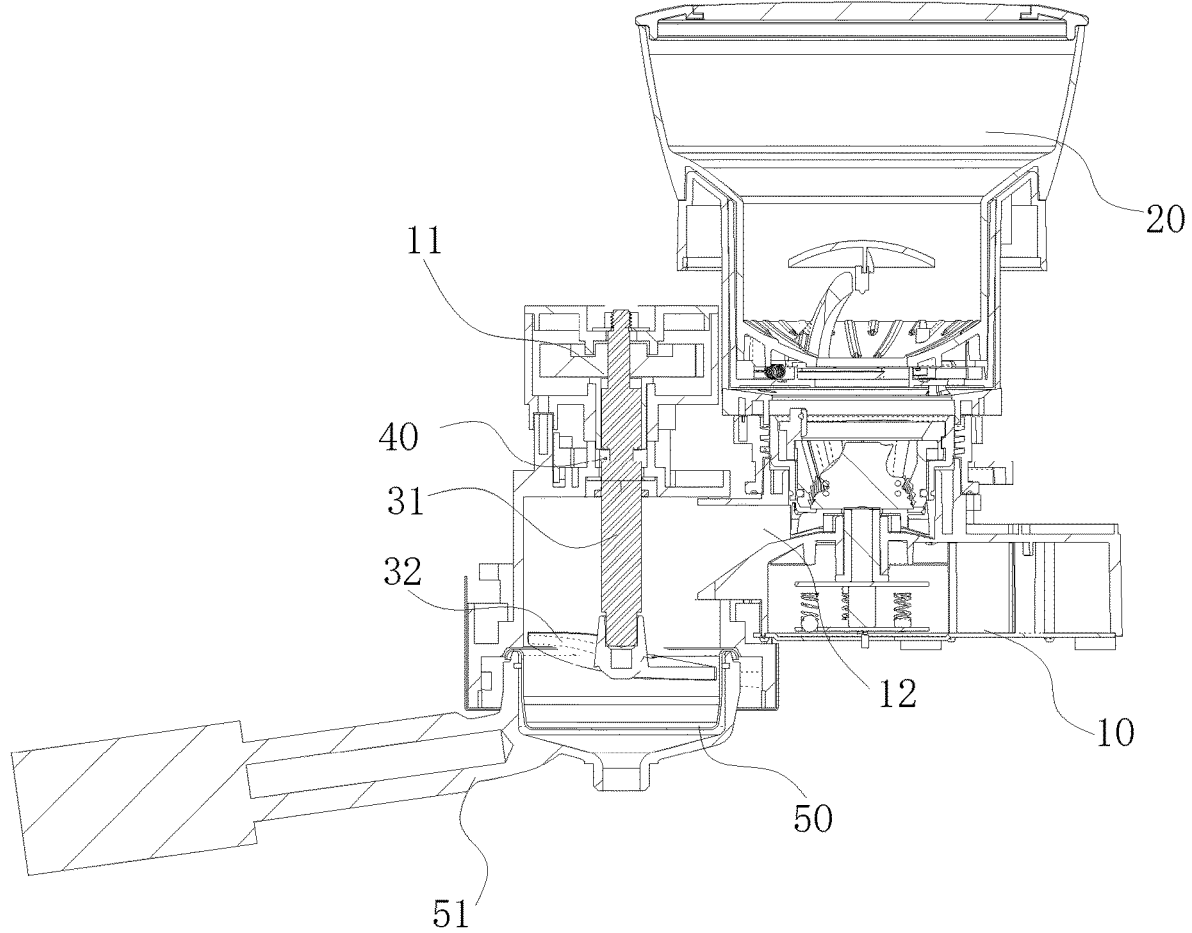
FIG. 2 is a schematic view of an initial position of a coffee maker in an embodiment of the present disclosure.
Figure 3:
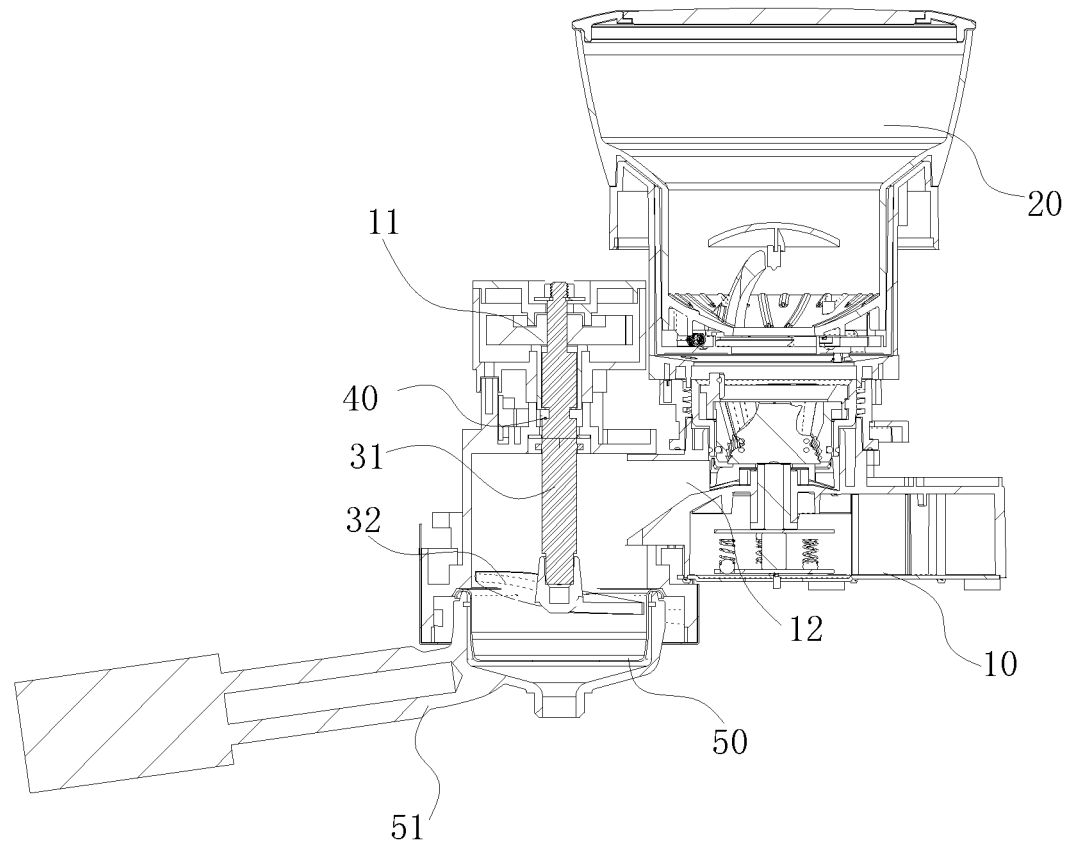
FIG. 3 is a schematic view of a sensing position of the coffee maker in the embodiment of the present disclosure.
Figure 4:
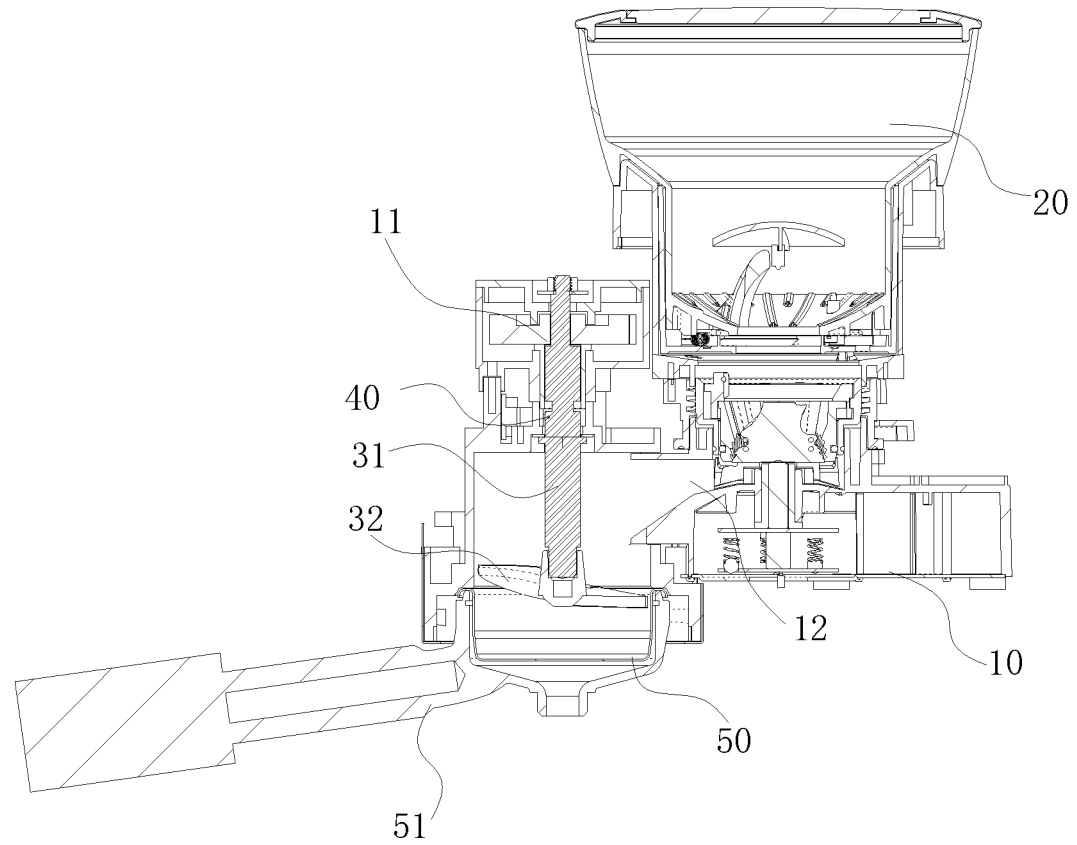
FIG. 4 is a schematic view of a compressed position of the coffee maker in the embodiment of the present disclosure.
Figure 5:
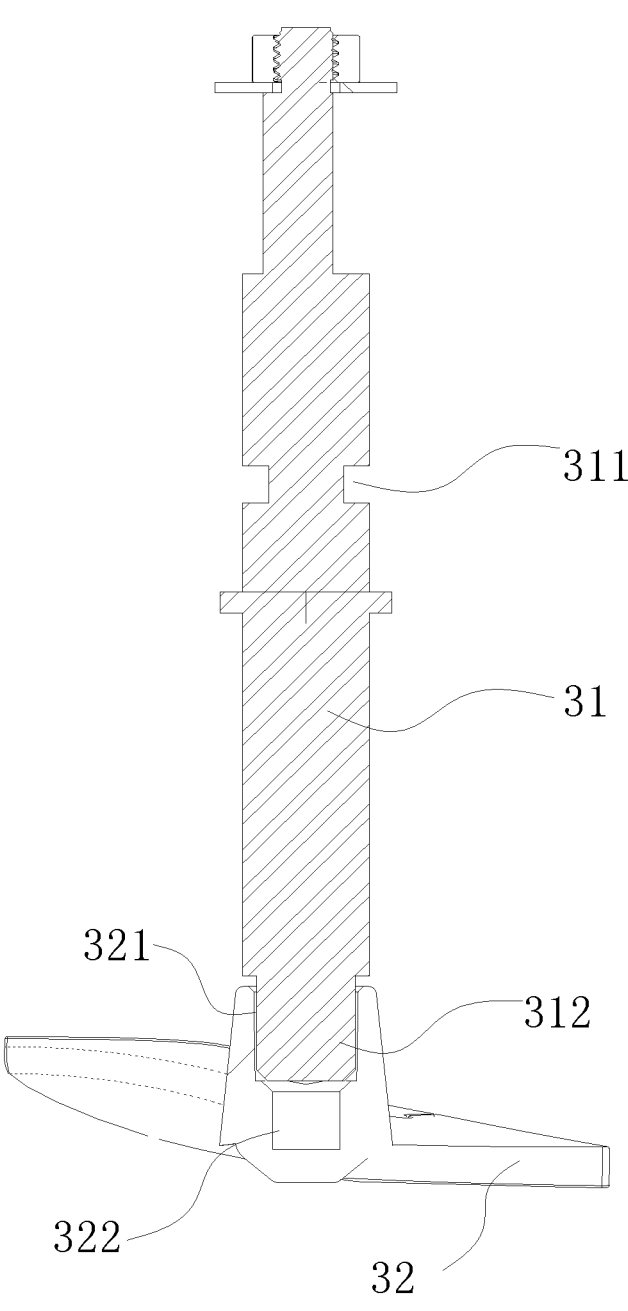
FIG. 5 is a schematic view of a powder compressing device in an embodiment of the present disclosure.

The grinding device 20 performs the grinding, and the ground coffee powder is output to the powder holder through the powder channel 12, and is compressed by the powder compressing device 30;

As the amount of the coffee powder increases, the powder compressing head 32 and the shaft 31 moves upward. When the shaft 31 moves upward to the first set position, the shaft neck 311 of the shaft 31 faces the sensor 40 (as shown in FIG. 2). The infrared light sent by the emitter 41 is received by the receiver 42, so as to trigger the sensor to obtain the first grinding time value T11. At this time, the grinding device 20 continues operating (as shown in FIG. 3). When the powder compressing head 32 and the shaft 31 further move to the second set position (as shown in FIG. 4), the shaft 31 is stopped by the position-limiter 11 and no longer moves upwards, so as to compress the coffee powder into a compressed cylinder. The grinding device 20 continues operating and outputs the remaining coffee powder to the powder holder. The grinding device 20 prolongs operation for the time determined by the prolonged grinding time value T12, and then stops operating.

When the compressed cylinder is formed in the powder holder, it is used for the next step of brewing.

During the brewing, the amount of water required for brewing and the temperature of the brewing water can be determined according to the above-described method, so as to meet the requirements of automatic brewing and form a good taste.

The purpose of the above embodiments is to exemplarily reproduce and derive the technical solutions of the present disclosure, and to fully describe the technical solutions, object, and effect of the present disclosure, in order to make the public understand the content of the present disclosure more thoroughly and comprehensively. The protection scope of the present disclosure is not limited by the above embodiments.

The above embodiments are not exhaustive listings based on the present disclosure. There may also be a number of other implementations that are not listed. Substitutions and improvements as long as not violating the concept of the present disclosure all fall within the protection scope of the present disclosure. For example:

The above embodiments involve single cup or double cup, and the technical solutions of the present disclosure can also be applied with large cup or small cup. The capacity of the single cup, double cup, large cup, and small cup is not limited.

The fine grinding or coarse grinding described in the above embodiments can also be applied to different coffee varieties or processes.

The coffee maker used in the above embodiments forms ground coffee powder and to brew the same. It can be understood that the present disclosure can also be applied to form ground powders of other types of beverages or foods and to brew the same.

The inductive switch used herein can be a light inductive switch, a mechanical inductive switch, or other types of inductive switches.

What is claimed is:

1. A beverage or food brewing method, wherein the method comprises: producing powder through a grinding device and outputting the powder to a powder holder; when an amount of the powder in the powder holder reaches a set value, obtaining a first grinding time value T11 of the grinding device; according to the first grinding time value T11, obtaining a prolonged grinding time value T12 corresponding to the first grinding time value T11; continuing producing powder through the grinding device for a period of time determined by the prolonged grinding time value T12 and outputting the powder from the grinding device to the powder holder; wherein the powder enters the powder holder while the grinding device produces the powder, and the method further comprises: synchronously compressing the powder in the powder holder through a powder compressing device during the powder entering the powder holder, wherein the first grinding time value T11 is a current grinding time of the grinding device when the powder compressing device moves upward and reaches a first set position.

2. The beverage or food brewing method of claim 1, wherein T12=T11×M+N, wherein M is a first adjustment coefficient and N is a second adjustment coefficient.

3. The beverage or food brewing method of claim 1, further comprising: according to a grinding time value T1, obtaining a grinding range Q corresponding to the grinding time value T1; according to the grinding range Q, obtaining a water injection amount S corresponding to the grinding range Q; according to the water injection amount S, injecting a corresponding amount of water into the powder to complete brewing.

4. The beverage or food brewing method of claim 3, wherein the grinding range Q is selected from at least a first range Q1 and a second range Q2; a start point of the first range Q1 is q1, and an end point of the first range Q1 is q6; a start point of the second range Q2 is q7, and an end point of the second range Q2 is q12; wherein q1<q6<q7<q12;

when q1≤T1≤q6, the grinding time value T1 is in the first range Q1;

when q7≤T1≤q12, the grinding time value T1 is in the second range Q2.

5. The beverage or food brewing method of claim 4, wherein the first range Q1 and/or the second range Q2 at least comprises a first sub-range FQ1 and a second sub-range FQ2; the method further comprises: according to the grinding time value T1, determining the first sub-range FQ1 or the second sub-range FQ2 corresponding to the grinding time value T1; according to the first sub-range FQ1 or the second sub-range FQ2, obtaining brewing time information P or brewing temperature information C corresponding to the first sub-range FQ1 or the second sub-range FQ2; according to the brewing time information P, brewing the beverage or the food according to the brewing time determined from the brewing time information P, or according to the brewing temperature information C, brewing the beverage or the food according to a brewing temperature determined from the brewing temperature information C.

6. The beverage or food brewing method of claim 5, wherein in the first range Q1, a start point of the first sub-range FQ1 is q2, and an end point of the first sub-range FQ1 is q3; a start point of the second sub-range FQ2 is q4, and an end point of the first sub-range FQ1 is q5;

in the second range Q2, a start point of the first sub-range FQ1 is q8, and an end point the first sub-range FQ1 is q9; a start point of the second sub-range FQ2 is q10, and an end point of the second sub-range FQ2 is q11; wherein q1≤q2≤q3≤q4≤q5≤q6≤q7≤q8≤q9≤q10≤q11≤q12.

7. The method of claim 1, further comprising: providing a readable storage medium on which a control program is stored, and the control program controls the beverage or food brewing machine to implement the steps of the method of claim 1.

\* \* \* \* \*